United States Patent [19]
Kuklinski

[11] Patent Number: 6,029,519
[45] Date of Patent: Feb. 29, 2000

[54] APPARATUS AND METHOD FOR MANIPULATING A BODY IN A FLUID

[75] Inventor: Robert Kuklinski, Portsmouth, R.I.

[73] Assignee: The United States of America as represented by the Secretary of the Navy, Washington, D.C.

[21] Appl. No.: 09/110,737

[22] Filed: Jun. 29, 1998

[51] Int. Cl.$^7$ .................................................. G10K 15/00
[52] U.S. Cl. .............................. 73/570.5; 73/148; 180/0.5
[58] Field of Search .................................. 73/570.5, 148, 73/147; 181/0.5

[56] References Cited

U.S. PATENT DOCUMENTS

| | | | |
|---|---|---|---|
| 5,006,266 | 4/1991 | Schram | 73/570.5 |
| 5,203,209 | 4/1993 | Watkins et al. | 73/570.5 |

*Primary Examiner*—John E. Chapman
*Attorney, Agent, or Firm*—Michael J. McGowan; James M. Kasischke; Prithvi C. Lall

[57] ABSTRACT

Apparatus for testing hydrodynamic performance characteristics of an object is operative for remotely manipulating the object using standing acoustic wave fields. The object is provided with a plurality of internal solid bodies, each having a region of ordered voids. The object is placed in a fluid flow tunnel, and standing wave fields are propagated through the fluid by means of transducers mounted on the walls of the tunnel. The wave fields align the ordered voids in the solid bodies, and the alignment forces are transmitted to the bodies resulting in movement of the object. Matching pairs of transducers can be employed to create movement in roll, pitch, and yaw directions. Once a static position of the object is established by adjusting the power levels of the various transducers, movement of the object is accomplished by introducing ordered frequency shifts into the wave fields, or by physically moving the positions of the transducers relative to the object. Drag measurements can be calculated from the different transducer power levels required to maintain a static position of the object under varying fluid flow conditions and object orientations.

24 Claims, 12 Drawing Sheets

APPARATUS AND METHOD FOR MANIPULATING A BODY IN A FLUID

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to apparatus and methods for suspending and remotely manipulating a solid in a fluid by means of ultrasonic waves. More specifically, one aspect of the invention relates to an apparatus and method which applies ultrasonic bubble manipulation techniques to a solid material containing a predetermined region of encapsulated gas bubbles to remotely manipulate that solid within a fluid. In another aspect of the invention, the same ultrasonic bubble manipulation techniques are applied to manipulate such a solid in a fluid flow tunnel, and to measure hydrodynamic drag of the solid under varying flow conditions.

(2) Brief Description of the Prior Art

In the development of undersea vehicles it is highly advantageous to be able to test the vehicles hydrodynamic characteristics in fluid flow conditions prior to actual construction of a prototype vehicle. In this regard, small scale models of new vehicles are usually suspended within a fluid flow duct, i.e., water tunnel, and evaluated for their fluid flow properties. Typical methods of suspending the models within the fluid flow tunnel include wires, strings or struts which physically suspend the vehicles position within the fluid flow. While this method of testing provides valuable information, the introduction of large supporting objects into the fluid flow alters the flow of the fluid through the duct and thus alters the results that are obtained. It is impossible to completely escape this problem as long as a foreign object is in the flow.

At present, there are few means available to effectively suspend or manipulate the position of a solid in a fluid without physically attaching to the object. Existing non-physical suspension methods, such as using an electric or magnetic field to manipulate positions of solids have serious shortcomings. The basic problem is that in order to exert large forces via magnetic and electric fields, it is desirable to be as close as possible to the object. Thus, to suspend an object in a fluid via magnetic fields, a magnet or the equivalent would have to be near the object in the fluid, or very near a boundary of the fluid. Either case is undesirable since the location of the magnet near the solid, or the location of the solid body near the wall of the fluid flow tunnel will obviously alter the fluid flow near the solid body.

Accordingly, there is a serious need for an effective method for suspending and remotely manipulating solids in a fluid flow without physically exerting control over the solid or introducing physical supporting structures into the fluid flow chamber. Furthermore, there is also a need for an apparatus and method for effectively measuring drag within a fluid flow without affecting fluid flow or operation of the water tunnel.

SUMMARY OF THE INVENTION

It is therefore an object of the present invention to provide a method and apparatus for spatially positioning solids suspended in a fluid, or fluid flow, by means of an ultrasonic field.

It is another object to provide a method and apparatus for spatially positioning solids suspended in a static fluid without creating a fluid flow field.

It is another object to provide a method and apparatus for spatially positioning solids suspended in a fluid flow field without modifying the existing fluid flow field.

It is still another object to provide a method and apparatus having the ability to spatially position solids suspended in a fluid at large distances.

It is yet another object to provide a method and apparatus for positioning a solid in a fluid using a modest amount of energy.

It is still another object to provide a method and apparatus for moving the solid in any direction within the fluid.

It is yet another object to provide a method and apparatus for holding or suspending, moving or accelerating an object against a force such as gravity or fluid flow.

It is still another object to provide a method and apparatus for conducting uncontaminated hydrodynamic measurements on an arbitrarily shaped body in any liquid.

It is still a further object to provide a method and apparatus to perform the above measurements in real time and to provide a method and apparatus which will accomplish the above provisions without interfering with any normal operations of a water tunnel.

In accordance with the above-noted objects, this invention applies ultrasonic particle/bubble manipulation techniques to a solid material containing a predetermined region of encapsulated gas bubbles, i.e., voids, thereby achieving static positioning and movement of the solid within a fluid. The basic concept of the invention is to use a controlled sequence of ultrasonic wave fields to produce forces on bubbles embedded in a solid. The forces are then transmitted to the solid surrounding the embedded bubbles resulting in motion of the solid object. In a basic form, a solid body is provided with a region of ordered voids. In this region, parallel rows of micro bubbles are preferably spaced along predetermined nodal lines of the wave fields. The solid body is suspended in the fluid and an ultrasonic wave field is propagated through the fluid. The wave field generates forces on the voids in the solid body, and the forces are transmitted to the surrounding material resulting in movement of the solid body.

The concepts of the invention are ideally embodied in apparatus for testing hydrodynamic performance characteristics of undersea test vehicles. The apparatus remotely manipulates the test vehicle using ultrasonic fields. The test vehicle, comprises an outer shell having a contoured outer surface in the shape of a prototype design, and an inner reaction core which is provided with a plurality of internal solid bodies, each having a region of ordered voids. The test vehicle is placed in a water tunnel equipped with a plurality of transducers capable of producing ultrasonic wave fields. Ultrasonic wave fields are then created by the transducers which are mounted within the walls of the water tunnel. The ultrasonic wave fields generate forces on the voids in the solid bodies and the forces are transmitted to the surrounding core and outer shell resulting in movement of the test vehicle. Once a static position of the test vehicle is established by adjusting the power levels of the various transducers, desired movements of the test vehicle are accomplished by introducing ordered frequency shifts into selected wave fields or by physically moving the positions of selected transducers relative to the test vehicle. By placing complementary pairs of solid bodies at predetermined locations within the test vehicle shell, and using corresponding pairs of transducers for each solid body, movement and acceleration in roll, pitch, and yaw directions can be created. Drag measurements can be calculated by determining the base transducer power levels required to maintain a static position of the reaction core in control conditions, and then measuring and comparing the different transducer power levels required to maintain a static position of the full test vehicle under varying water flow conditions and test vehicle orientations.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE INVENTION

Figure 1:
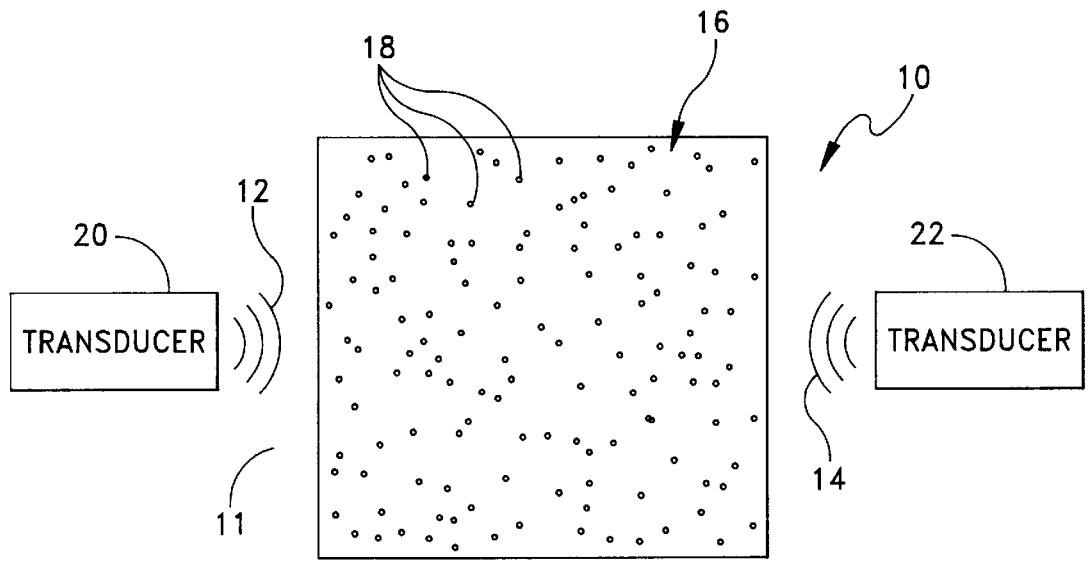
FIG. 1 is a plan view showing ultrasonic waves directed towards a solid body containing randomly oriented voids.

Referring now to the drawings, and more particularly to FIGS. 1–9, a system for manipulating a solid body suspended in a fluid is generally indicated at 10. As will hereinafter be more fully described, the basic concept of the invention is to use ultrasonic wave fields to produce forces on bubbles embedded in a solid, which force is subsequently transmitted to the solid surrounding the embedded bubbles resulting in the motion of the solid object.

Generally, FIG. 1 shows the interaction in a fluid 11 between standing ultrasonic wave fields 12, 14, and a solid body generally indicated at 16 containing randomly oriented voids, i.e., embedded gas bubbles 18. The wave fields 12, 14 are generated by transducers 20, 22 respectively. Transducers 20, 22 are of the type well known in the electronic art, and therefore the specific construction thereof will not be described in detail. The arrangement is such that the standing wave fields generated by the transducers 20, 22 exert forces on each bubble 18 embedded in the solid body 16. The amount of force an individual bubble 18 experiences is a function of the intensity of the acoustic transmission, the relative acoustic impedance mismatch between the bubble 18 and the surrounding solid material 16, and the relative size of the bubble 18 relative to the acoustic wavelength. Optimal forcing occurs when the bubble diameter is approximately one sixth of the distance of nodal line spacing of the wave fields 12, 14. In this regard, to operate effectively, the frequency of the ultrasonic transmission generated by transducers 20, 22 is adjusted to accommodate a desired bubble size. To further optimize the force on the bubbles 18, the acoustic impedance of the solid 16 and surrounding liquid 11 should be matched as closely as possible. In connection with the above, it should be noted that most gases have large impedance mismatches between themselves and surrounding solids so energy is effectively deposited in the matrix. An example of an effective combination of solids, gasses and liquid for purposes of the invention would be air or helium bubbles embedded in an elastomer surrounded by water.

The continuous ultrasonic waves 12, 14 generated by the transducers 20, 22 exert a force on each bubble 18 which is directed toward nodes of the wave fields. In this connection, whether the force is directed toward nodal or anti-nodal lines will depend on the relative density of the gas and the fluid. In any case, the only difference would be a displacement of the nodal lines by one half wavelength and no change in the overall effect or operation of the device. The total force the solid body 16 will experience is a sum of the force exerted on each individual bubble 18. With respect to FIG. 1, the voids (bubbles) are randomly oriented, and therefore the total force, or summation of those forces, will be approximately equal to zero, assuming the frequency of each transducer 20, 22 is equal.

Figure 2:
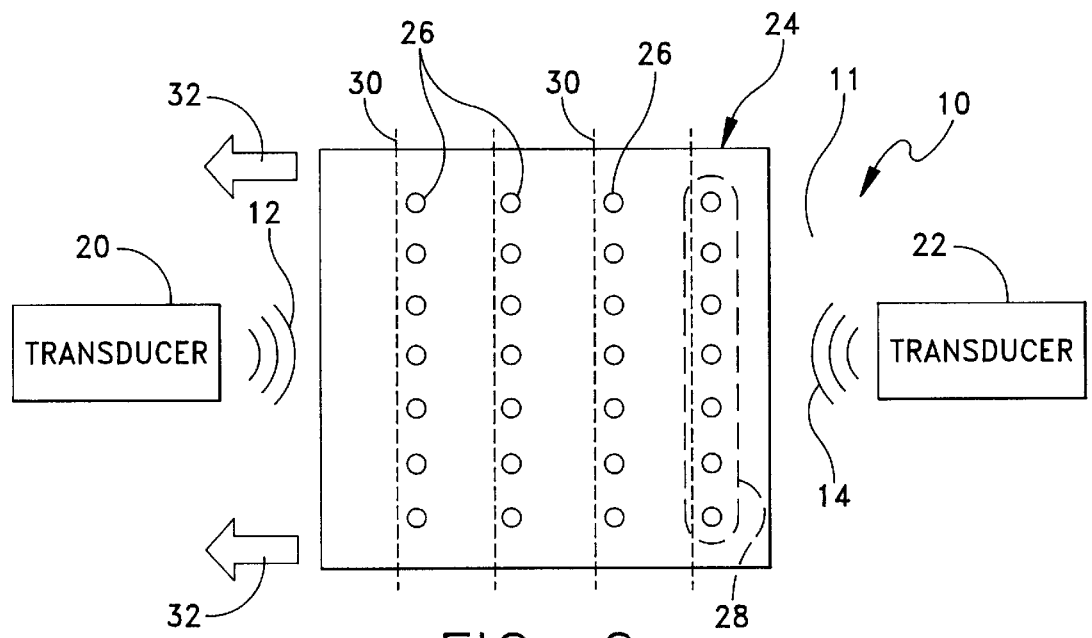
FIG. 2 is a plan view showing ultrasonic waves directed towards a solid body containing an ordered arrangement of voids which are aligned in parallel rows.

Referring now to FIG. 2, a solid body 24 containing an ordered arrangement of embedded gas bubbles 26 is illustrated. More specifically, the ordered arrangement of bubbles 26 comprises a plurality of equally spaced rows 28 (enclosed in broken lines in FIG. 2). When the body 24 is arranged with the bubble rows 28 parallel to the nodal lines 30 (broken lines), each bubble 18 experiences a force directed toward the nodal line 30 and in turn, each bubble 18 exerts a force on the solid body 24 in the same direction. Arrows 32 illustrate this force. An optimal configuration would be an alignment of rows 28 of bubbles 18 whose spacing is exactly one wavelength apart. Since the wavelength is a function of frequency of transmission, only a narrow band of frequencies need be used to operate effectively. The time required to force the bubbles 18 and reposition solid body 24 with a specific gravity equal to one, is on the order of one tenth of a second if a 1 MHZ signal is used to position optimally packed embedded 200 µm air bubbles.

Figure 3:
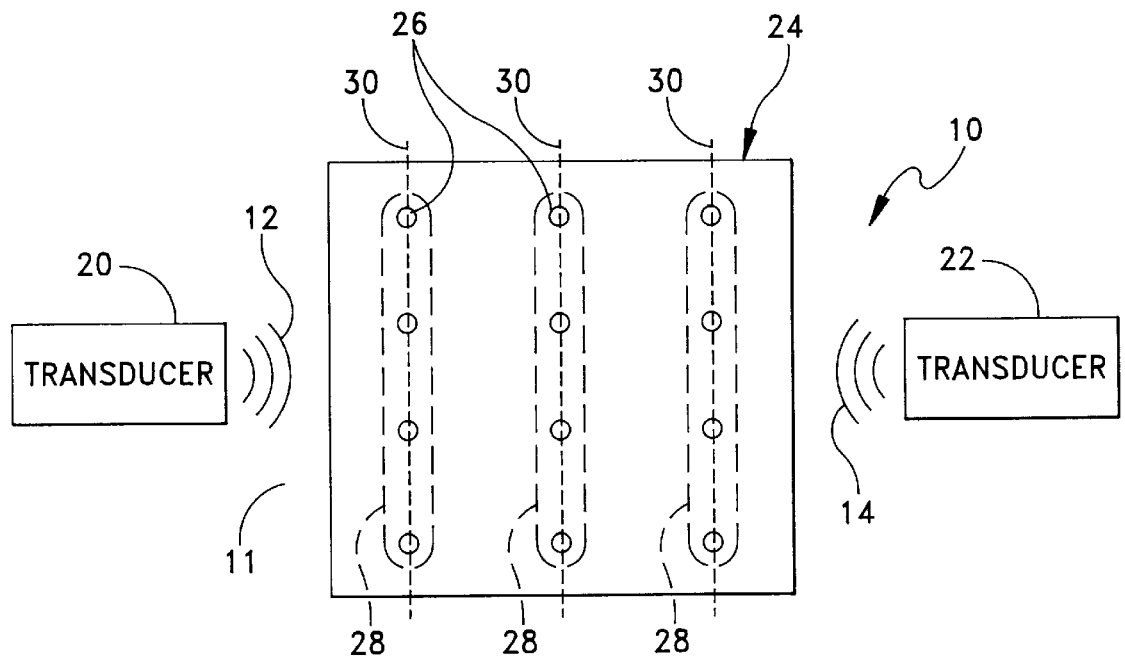
FIG. 3 is a plan view showing ultrasonic wave fields equally applied from two opposing transducers and the rows of voids aligned along the nodal lines of the wave field.

Referring now to FIG. 3, oppositely disposed transducers 20, 22 are shown generating continuous wave fields 12, 14 towards solid body 24. As described previously, the solid body 24 contains rows 28 of bubbles 26 which are aligned parallel to nodal lines 30, and as can be seen from the drawing figure, the bubbles 26 are already aligned with the nodal lines 30. In the illustrated example, the frequency of each of the transducers 20, 22 is equal, and, therefore, the net force on the solid body 24 is zero. Such a condition is effective for maintaining a static position of the solid body 24 within the fluid 11. If an external force were applied to the solid body 24, the ultrasonic fields 12, 14 would exert forces on the bubbles 26 to realign the bubble rows 28 along the nodal lines 30.

Figure 4:
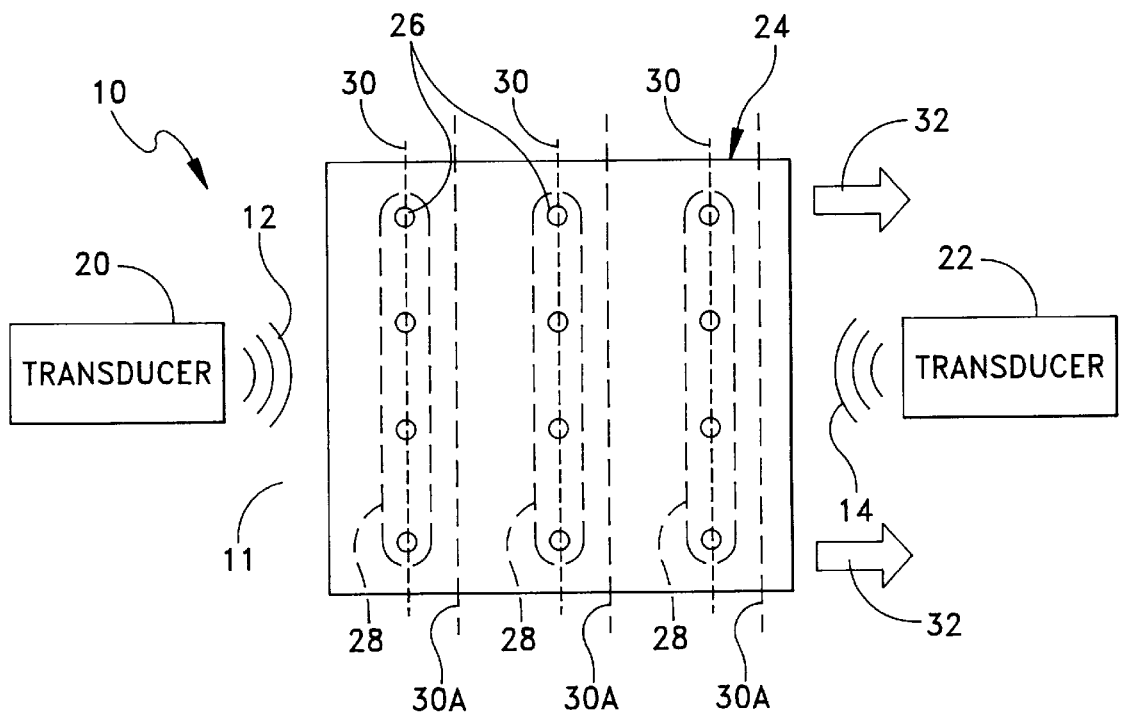
FIG. 4 is a plan view showing the introduction of a frequency shift in one of the wave fields and the resulting movement of the solid body.

Referring now to FIG. 4, a frequency shift is introduced in one of the transducers 20 to impart motion to the solid body 24. Originally, the frequencies of each transducer 20, 22 are equal, the solid body 24 is at rest and the bubble rows 28 are aligned along the nodal lines 30. However, when a small frequency shift is introduced in one transducer 20, the frequency shift results in a migration of the nodal lines to the right (30A). This shift is indicated by arrows 32. The result is that the bubbles 26 are forced to move toward the new nodal line positions 30A. By introducing controlled frequency shifts, the solid body 24 can be moved or accelerated.

Figure 5:
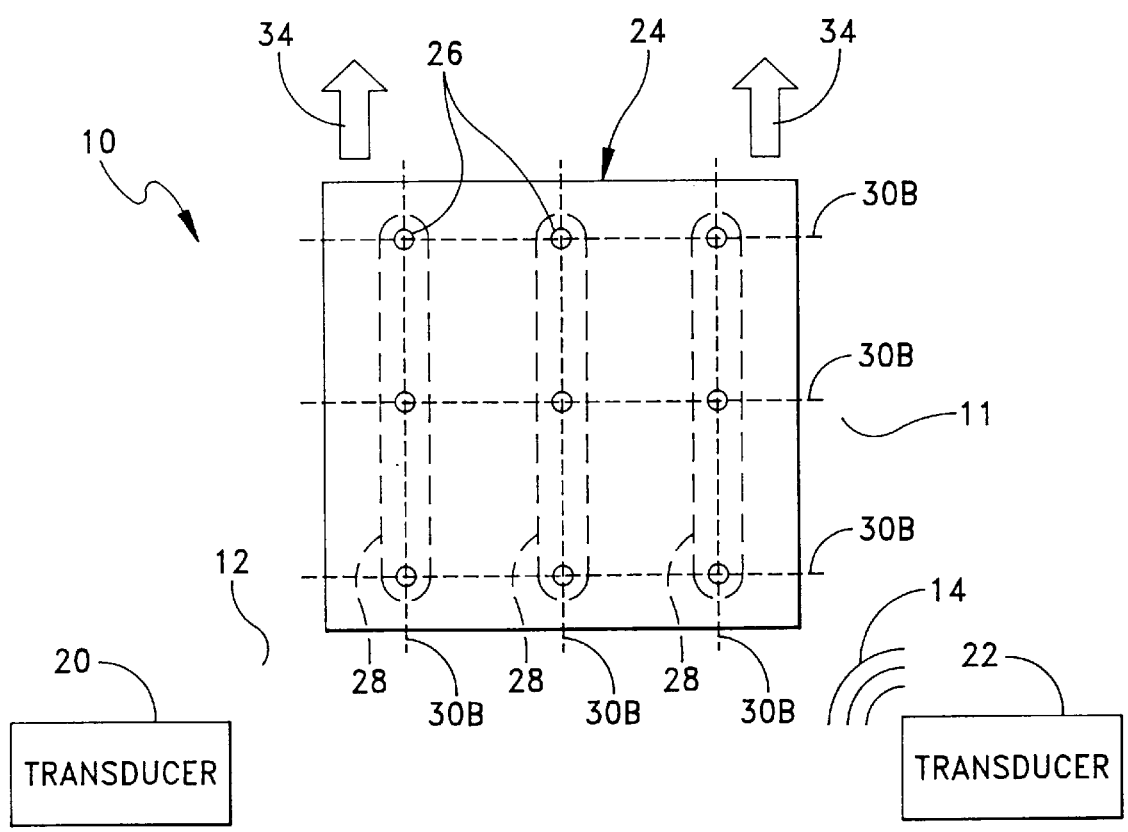
FIG. 5 is a plan view of an alternate arrangement wherein two transducers are oriented at 45 degree angles to the solid body to achieve movement of the body in a desired direction.

Referring now to FIG. 5, an alternate arrangement of the transducers 20, 22 relative to the solid body 24 is illustrated to show that the frequency sweeping techniques may be used with varying configurations of the transducers 20, 22. In particular, the transducers 20, 22 are oriented at 45 degree angles with respect to the solid body 24. The nodal lines 30B are produced at the intersection of fields 12 and 14. Wave fields 12, 14 generated by transducers 20, 22 produce forces on bubbles 26 and body 24 in the direction indicated by the arrows 34.

Figure 6:
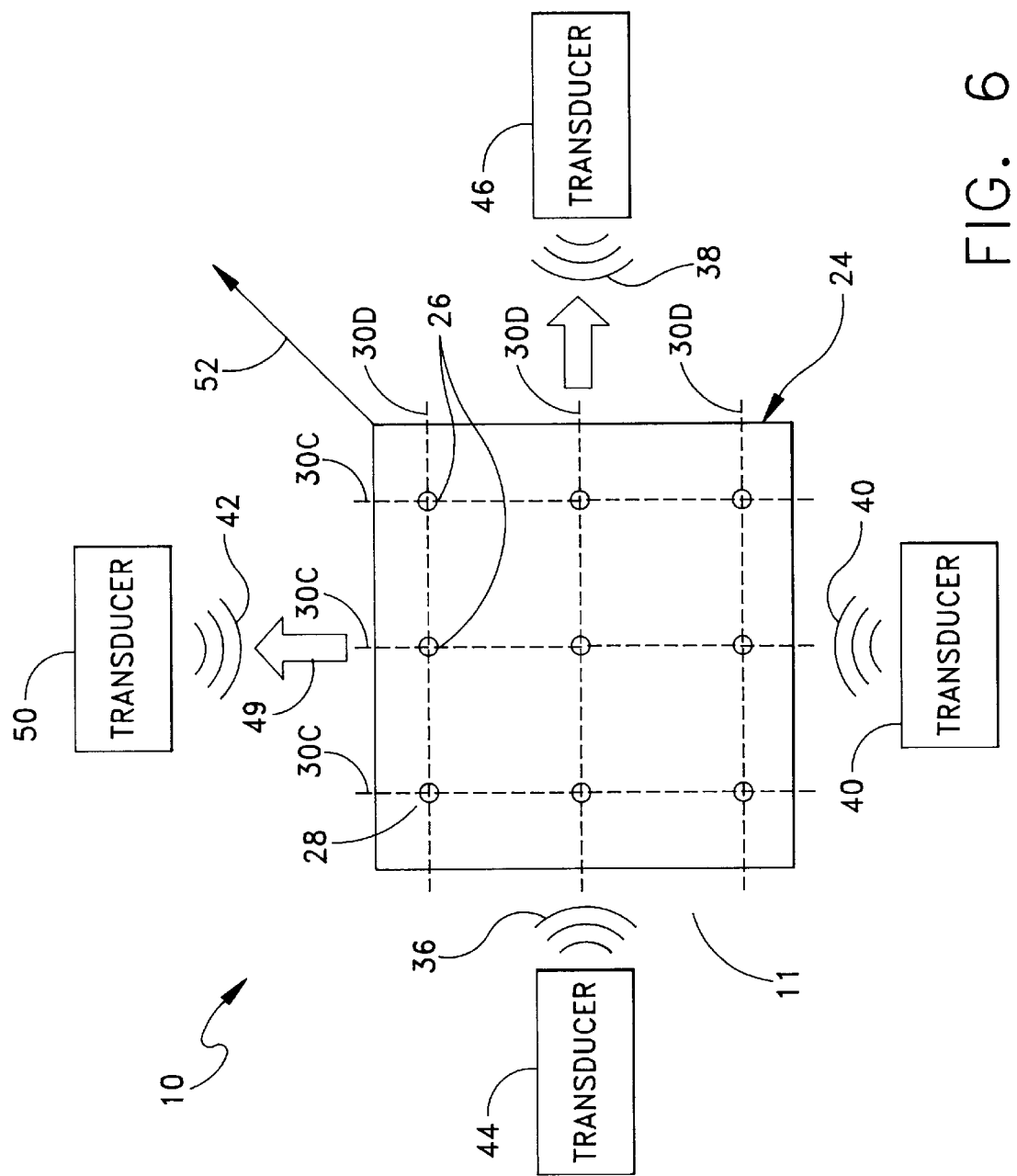
FIG. 6 is a plan view showing an arrangement of four transducers wherein frequency shifts in selected wave fields achieves movement in a desired direction.

FIG. 6 illustrates yet another configuration of transducers operable for generating four separate wave fields 36, 38, 40, 42 to move or accelerate the solid in any desired direction. More specifically, four transducers 44, 46, 48, 50 (opposing pairs) generate opposing standing wave fields. In the illustrated example, transducer 44 and transducer 46 provide a standing wave field 30C which sweeps in a horizontal direction 45 resulting in a force in the same direction 45 on bubbles 26. Transducers 48 and 50 provide waves 40 and 42 which combine to generate standing wave field 30D. Standing wave field 30D sweeps in a direction indicated by arrow 49 and generates a force on bubbles 26 in this same direction. These forces combine resulting in movement of the solid body 24 at a 45 degree angle indicated by arrow 52. However, it can be appreciated that infinite combinations of frequency shifts and driving forces can be utilized to effect motion of the solid body in virtually any direction.

Figure 7:
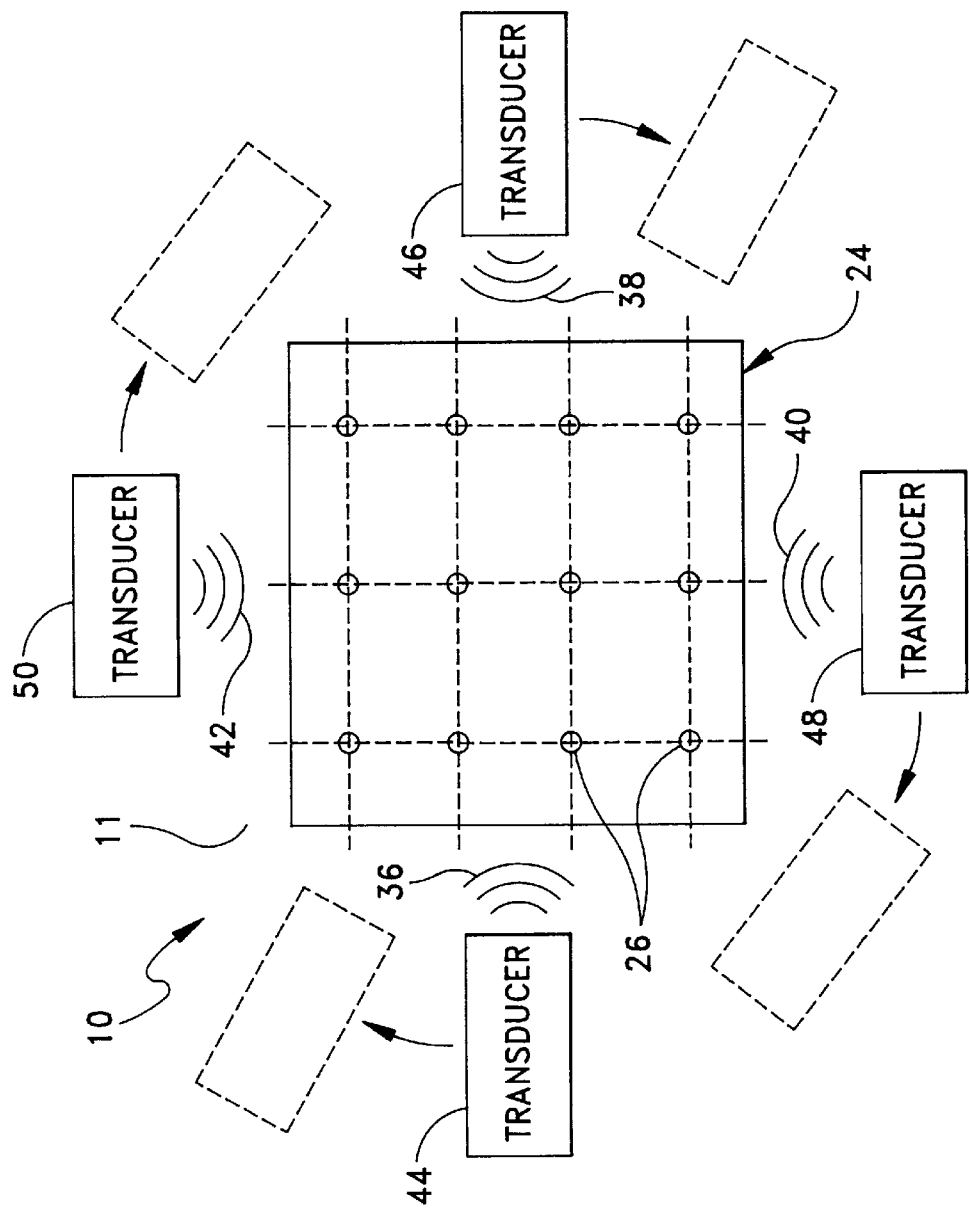
FIG. 7 is another plan view showing physical rotation of the transducers around the solid body to achieve rotational movement of the solid body.
Figure 8:
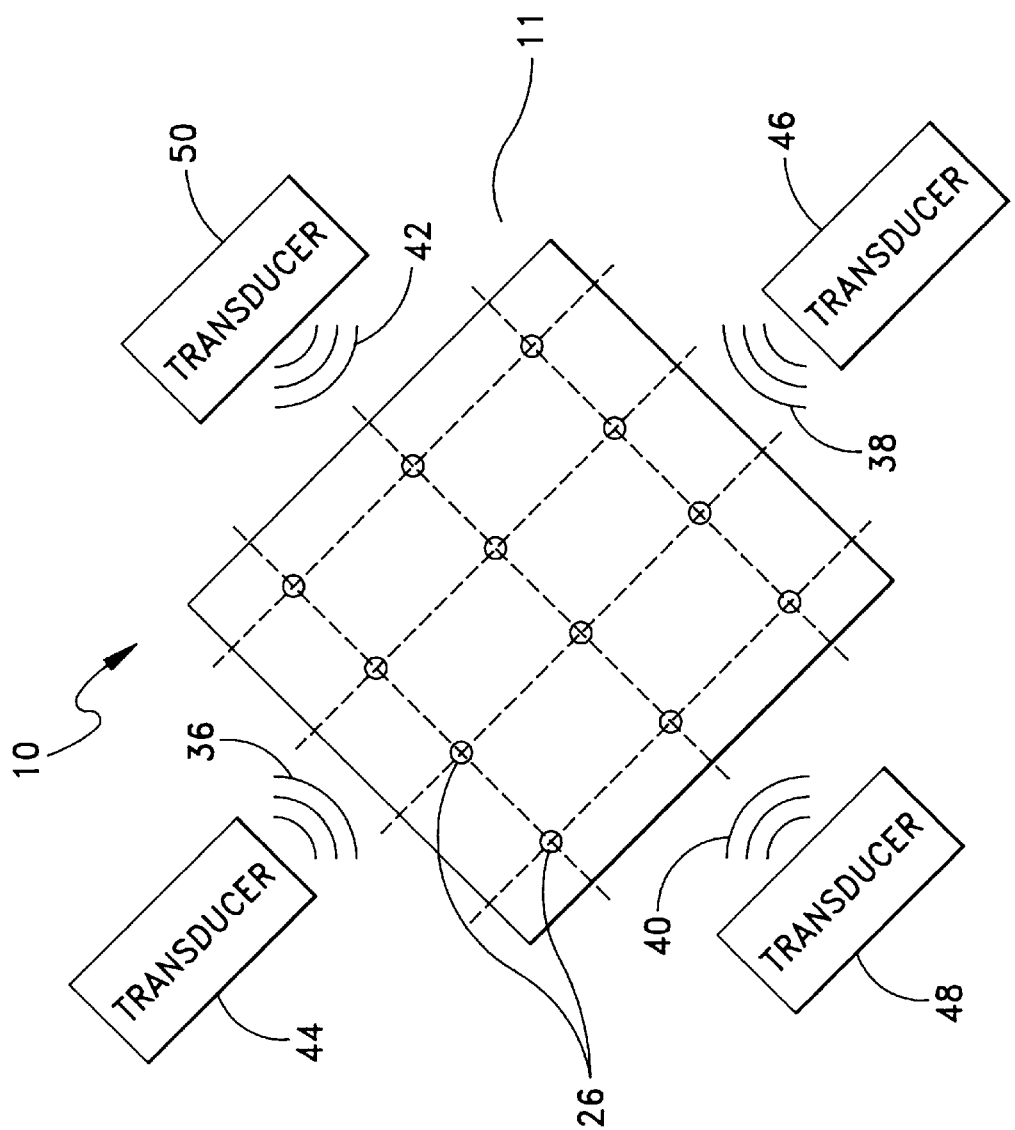
FIG. 8 is a similar view showing realignment of the voids in the body with the new positions of the transducers.

Referring to FIGS. 7 and 8, another means of imparting motion to the solid body 24 comprises physically moving the positions of the transducers 44, 46, 48, 50 relative to the solid body 24. In this regard, a single pair of transducers emitting a steady harmonic signal could be used to rotate a body of material. In the illustrated example, two pairs of transducers 44, 46, 48, 50 are shown rotating from a first position in FIG. 7 to a second position (shown in broken lines) in FIG. 8. The rate of rotation of the solid body 24 may be controlled by the rate of rotation of the transducers 44, 46, 48, 50 generating the ultrasonic wave fields. Body 24 remains locked in its orientation to the standing wave fields.

Figure 9:
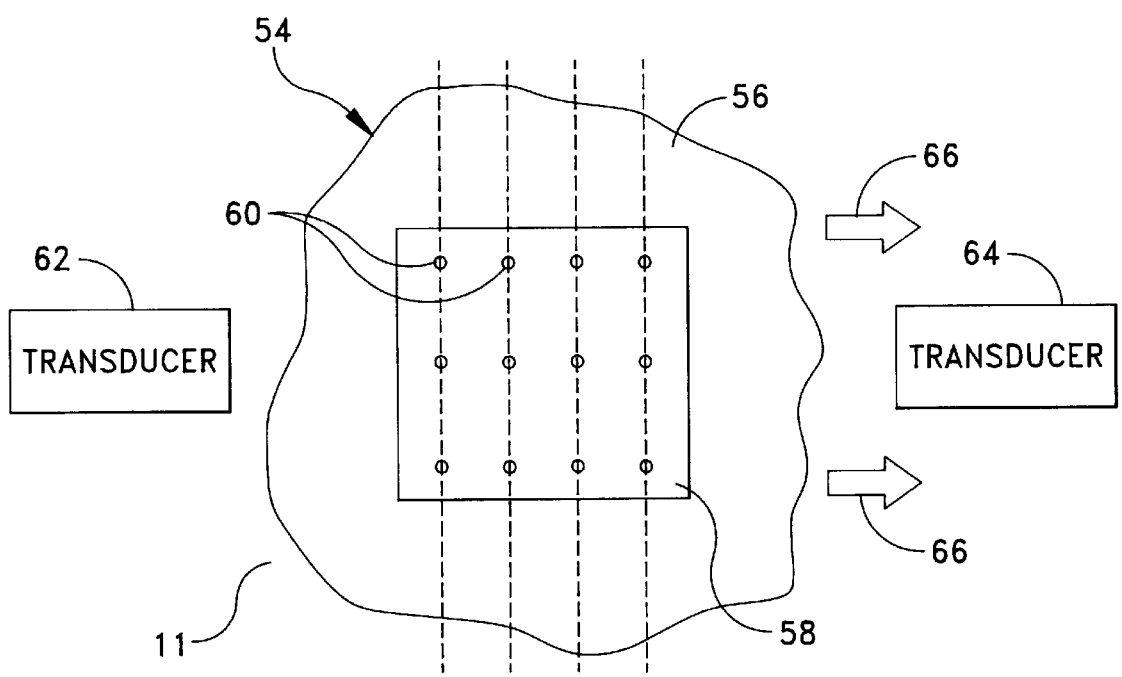
FIG. 9 is a plan view of a test element having an outer shell covering and an inner solid body with ordered voids.

Turning now to an application of the inventive concepts in a practical industrial situation, FIG. 9 shows an arbitrarily shaped test element generally indicated at 54 having an outer shell covering 56 and an inner solid body 58 embedded therein. The inner solid body 58 contains an ordered arrangement of voids 60 as previously described in accordance with the inventive concepts above. The entire arbitrarily shaped test element 54 may be moved in a similar fashion as discussed in the previous examples. In this example, the frequency output of the transducers 62, 64 is adjusted to move the object 54 in a direction indicated by arrow 66. An optimal outer shell material 56, i.e., covering material, would have the same acoustic impedance as that of the surrounding fluid 11. The test element 54 can be rotated, moved and accelerated just as described above in each of the previous examples.

Figure 10:
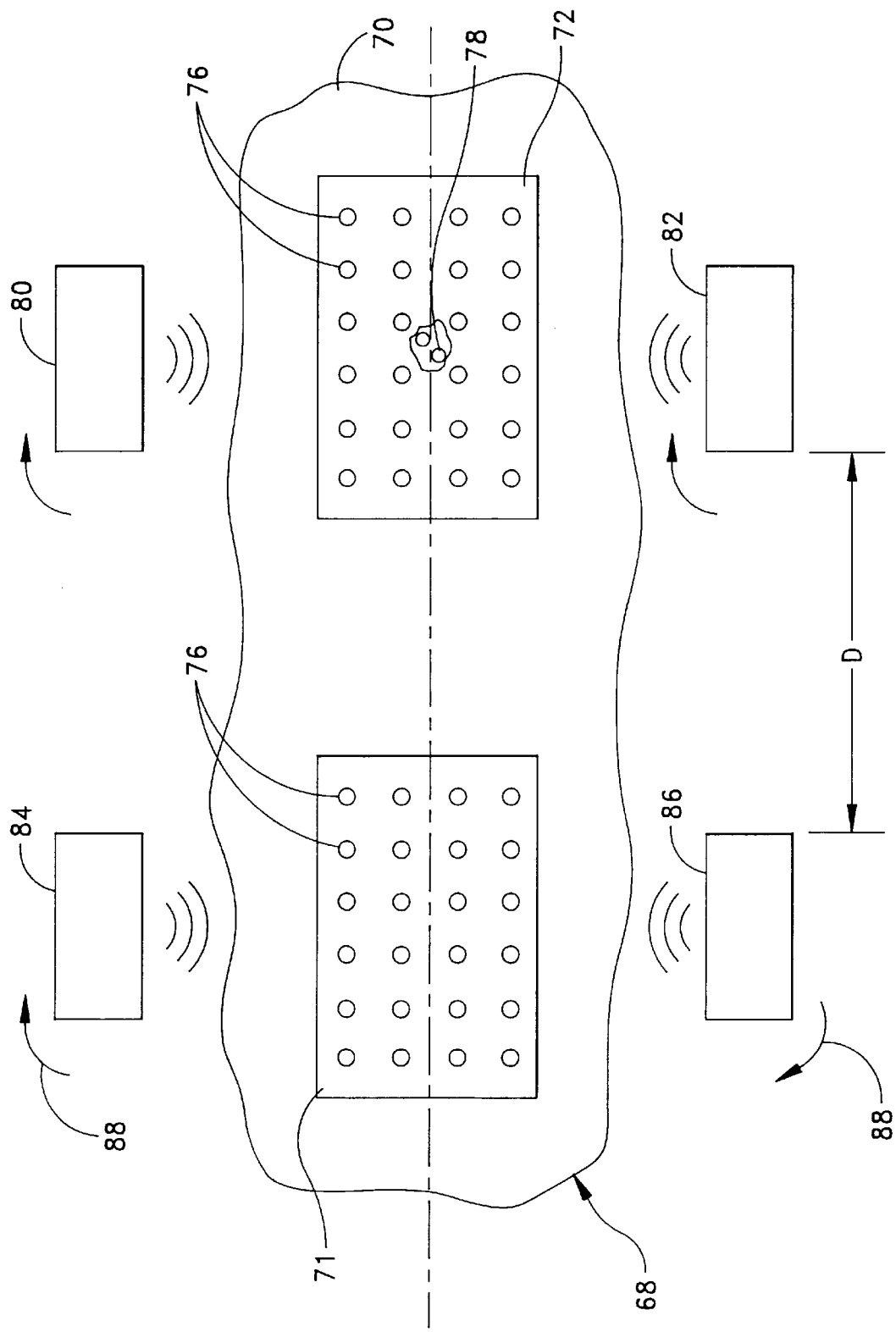
FIG. 10 is a plan view of another test element having two spaced solid bodies with ordered voids.
Figure 11:
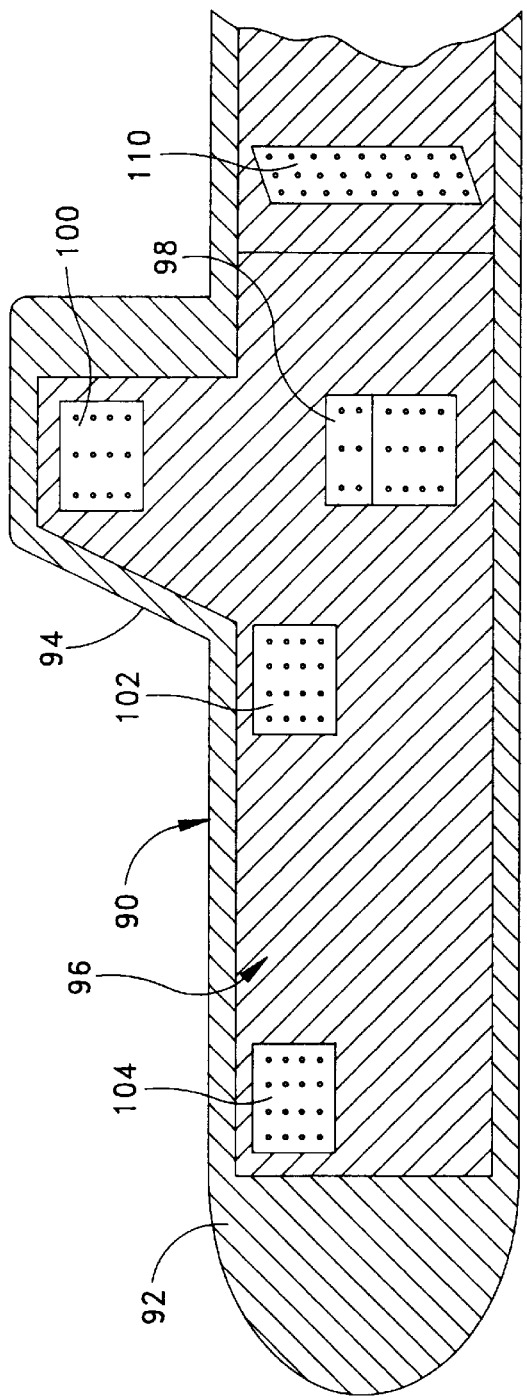
FIG. 11 is a cross-sectional view of a prototype test model having an outer shell and an inner reaction core having a plurality of solid bodies.
Figure 12:
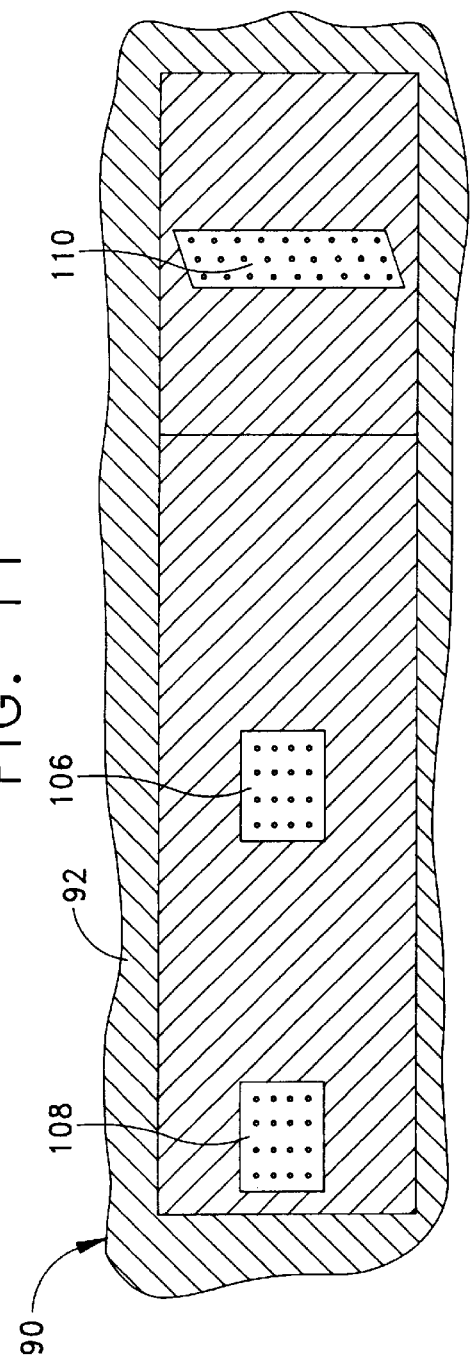
FIG. 12 is another cross-sectional view of the prototype submarine showing the pitch base and pitch movement bodies.

Referring to FIG. 10, another test element 68 comprising an outer shell 70 and two inner solid bodies 72, 74 with uniform voids 76 is illustrated. Rotation of the test element 68 about a center of buoyancy 78 is achieved by spacing inner solid bodies 72, 74, and using two separate pairs of transducers 80, 82 and 84, 86 to induce rotation. Ideally, one solid body 72 is located near the center of buoyancy for a fully immersed model. One pair of transducers 80 and 82 generating standing wave fields are used to hold solid body 72 near the center of buoyancy 78. The test element 68 will then rotate about the center of buoyancy in this case. Note that the transducers 80 and 82 must move to work optimally. Another pair of transducers 84 and 86 are located a distance D away from the center of buoyancy. Transducers 84 and 86 rotate in unison (arrows 88) and in doing so exert forces on solid body 74, and cause the test element 68 to rotate. Preferably transducers 84 and 86 and block 74 should be positioned as great a distance D as possible from the center of buoyancy 78 in order to provide a larger moment arm. It is also possible to move the test element 68 by frequency sweeping techniques alone.

Referring now to FIGS. 11–15, the principles of the present invention are ideally embodied in the form of a test system for testing the hydrodynamic performance characteristics of test vehicles in a fluid flow tunnel. In this regard, a prototype model of a submarine is illustrated and generally indicated at 90 in FIGS. 11–12. The model 90 comprises an outer shell 92 having a surface contour 94 in the shape of a prototype vehicle design, and an inner reaction core 96 containing a plurality of solid bodies having ordered voids. Reaction core 96 and outer shell 92 are separate to allow reaction core 96 to be removed and inserted into different outer shells 92. It should be understood that core 96 and shell 92 can be made as one piece if necessary. More specifically, the plurality of solid bodies comprises a roll hold body 98, a roll move body 100, a yaw hold body 102, a yaw move body 104, a pitch hold body 106 and a pitch move body 108. The reaction core 96 further includes an acoustic wave reflector body 110 for maintaining a longitudinal position of the model 90 within the length of a tunnel. Although reflector body 110 is shown as a trapezoid, it is in fact rectangular and is perpendicular to the plane of the figure. As previously stated, the outer shell material, reaction core material and solid body material should be acoustically matched for optimum performance of the system.

Figure 13:
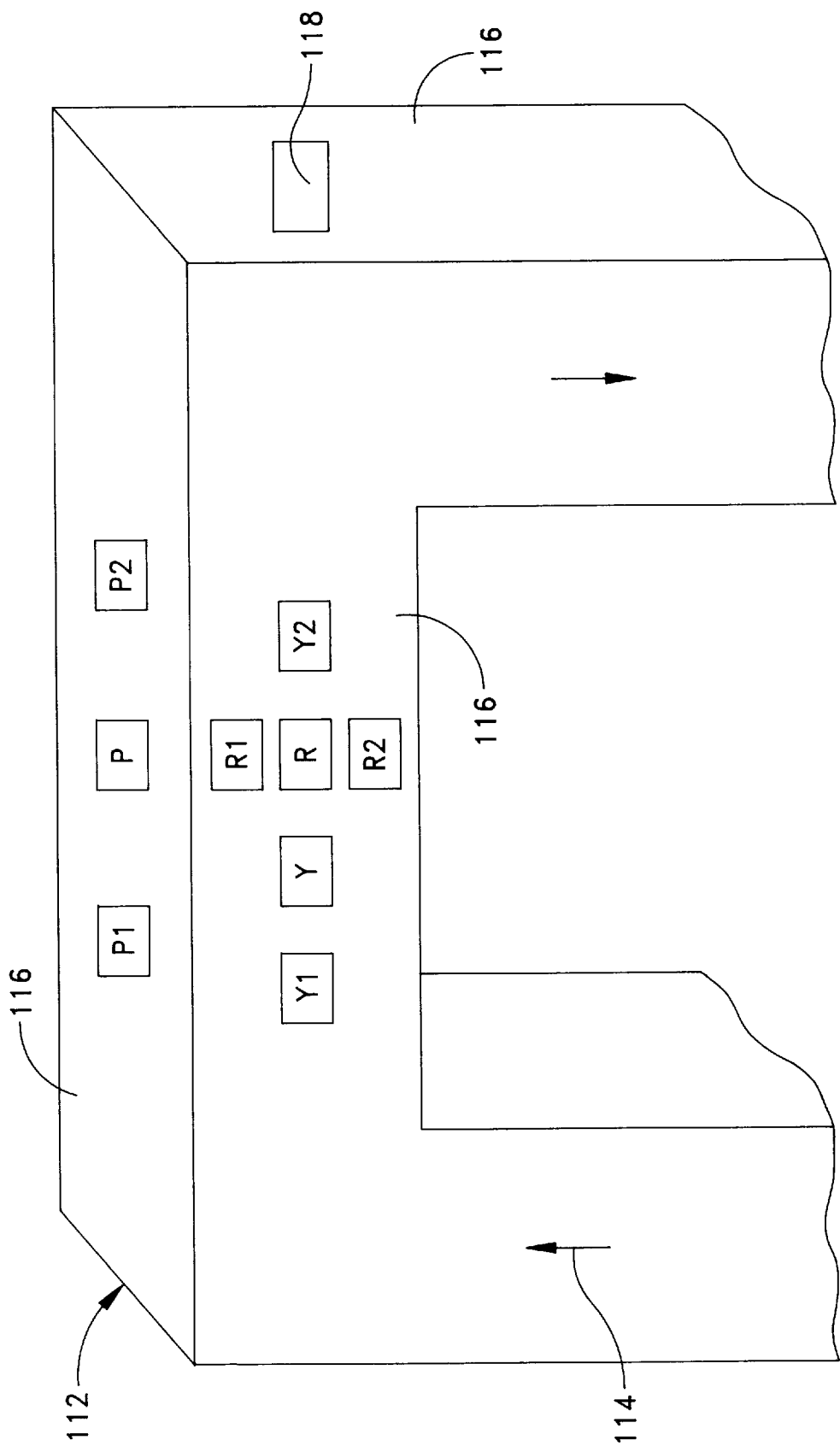
FIG. 13 is a perspective view of a fluid flow tunnel including a plurality of transducers located at various positions in the walls of the tunnel.
Figure 14:
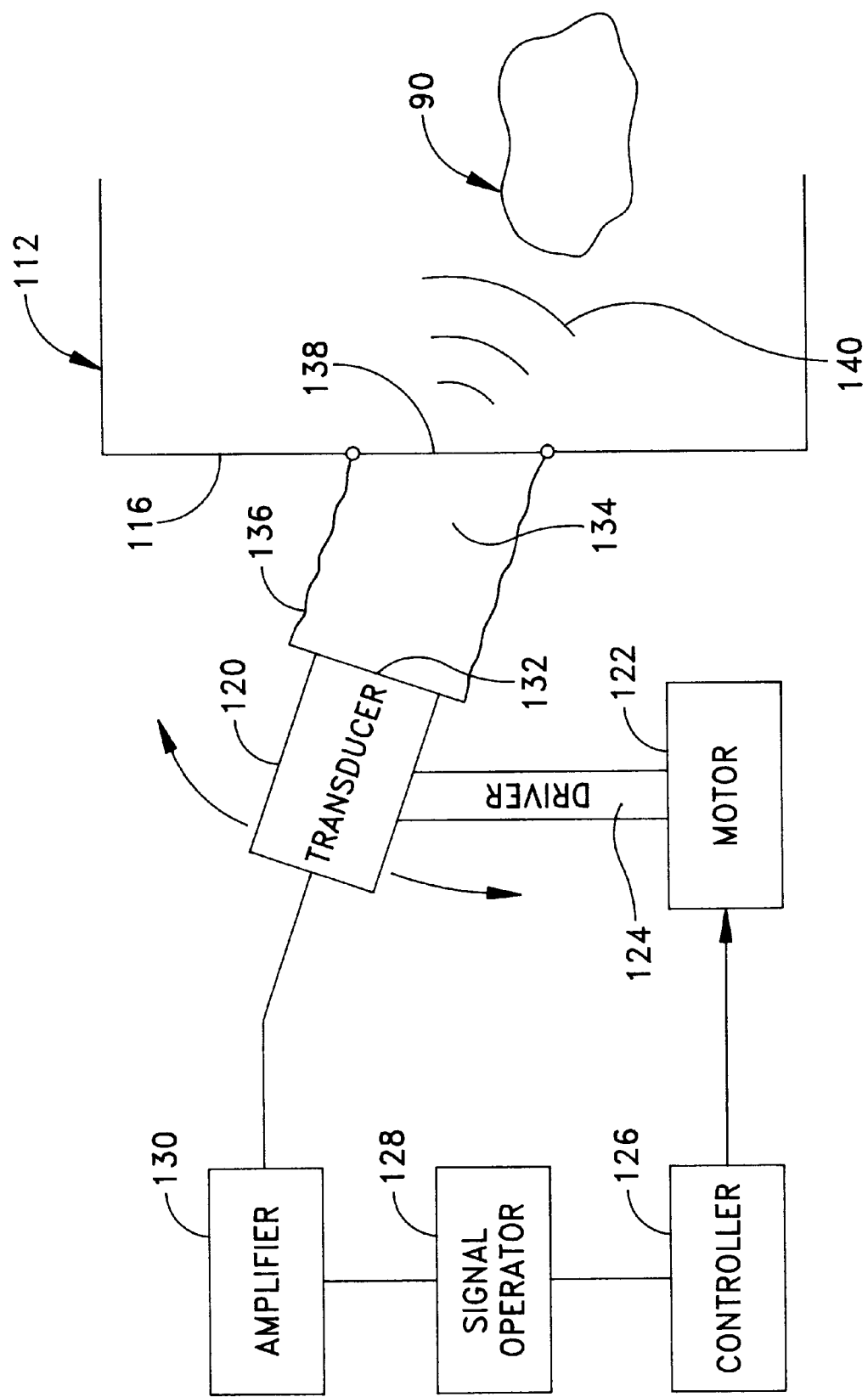
FIG. 14 is a schematic view of one of the transducer modules.

Referring to FIG. 13, a preferred arrangement of a fluid flow tunnel is illustrated and generally indicated at 112. The tunnel 112 is operative for providing a continuous fluid flow in a predetermined direction (arrow 114), and includes outer walls 116 for containing fluid flow, and fluid flow pumps (not shown) for varying and controlling the characteristics of the fluid flow. Fluid flow tunnels, for purposes of the present invention, are well known in the art, and therefore, the specific construction thereof will not be described in detail. The walls 116 of the fluid flow tunnel are provided with a plurality of transducer modules, namely, pitch hold transducer P, pitch move transducers P1 and P2, roll hold transducer R, roll move transducers R1 and R2, yaw hold transducer Y, and yaw move transducers Y1 and Y2, which are operative for controlling and manipulating movement of the test model 90 within the fluid flow tunnel 112. Positioning transducers 118 located at opposing ends of the tunnel 112 produce wave fields which react on the reflector body 110 for longitudinal positioning. Referring to FIG. 14, a schematic view of one of the transducer modules is illustrated in relation to the fluid flow tunnel 112. In terms of physical movement of the transducer module, the transducer body 120 is physically movable relative to the wall 116 of the fluid flow tunnel 112 by means of appropriate mechanical positioning systems, including a motor 122 and driver 124. A controller 126 controls the acoustic transmission of ultra sonic waves as well as position. With regard to the acoustic signal, the controller 126 controls a signal operator 128 and amplifier 130. The operation of transducers to provide acoustic waves is well known in the art, and therefore will not be described further herein. The transducer face 132 is exposed to an impedance matched fluid 134 enclosed in a flexible walled duct 136 that accommodates the motion of the transducer body 120. The inner end of the duct 136 is an acoustically transparent window 138 that forms a part of the wall 116 of the fluid flow tunnel 112, allowing the wave field 140 to penetrate into the fluid flow.

As can be seen from the drawings, there are one or more corresponding transducer modules associated with each of the solid bodies of the reaction core 96 for controlling respective movements. More specifically, for each set of transducers, one solid body will be positioned near the center of buoyancy of the model 90. In the optimal case, the model 90 is designed so that it is nearly neutrally buoyant. The other solid bodies are positioned at opposite large moment distances away from the center of buoyancy and corresponding transducers are positioned in complementary location in the fluid flow tunnel 112. In this way rapid motion and rotation in any direction is possible. A steady or time varying source of ultrasound may be used to move, rotate or accelerate the model in any desired direction.

As a method of determining drag measurements of the prototype design, the inner reaction core 96, without the outer shell, is calibrated in water in the tunnel 112 to determine the level of force that the ultrasonic fields exert on the solid bodies for a given orientation of the reaction core 96. Having this base calibration information allows drag measurements to be taken when the shell 92 is received over the core 96. With the outer shell 92 in place, the model 90 is brought to a static position within the fluid flow tunnel 112 and the flow started. During testing, the test model 90 may undergo yaw, pitch and roll movement selectively controlled by frequency output and/or positioning of transducers. At each desired flow condition, the power levels required to hold the model 90 stationary against the flow are recorded. This is compared to the calibration data to obtain the actual drag the outer shell 92 experiences under the varying fluid flow conditions. In order to provide visual observation of the model 90 during testing, the tunnel would optimally have a window (now shown) to view and record a time history of the motion of the model. In the absence of a window, a transponder system (not shown) could be used to record position of the model.

Figure 15:
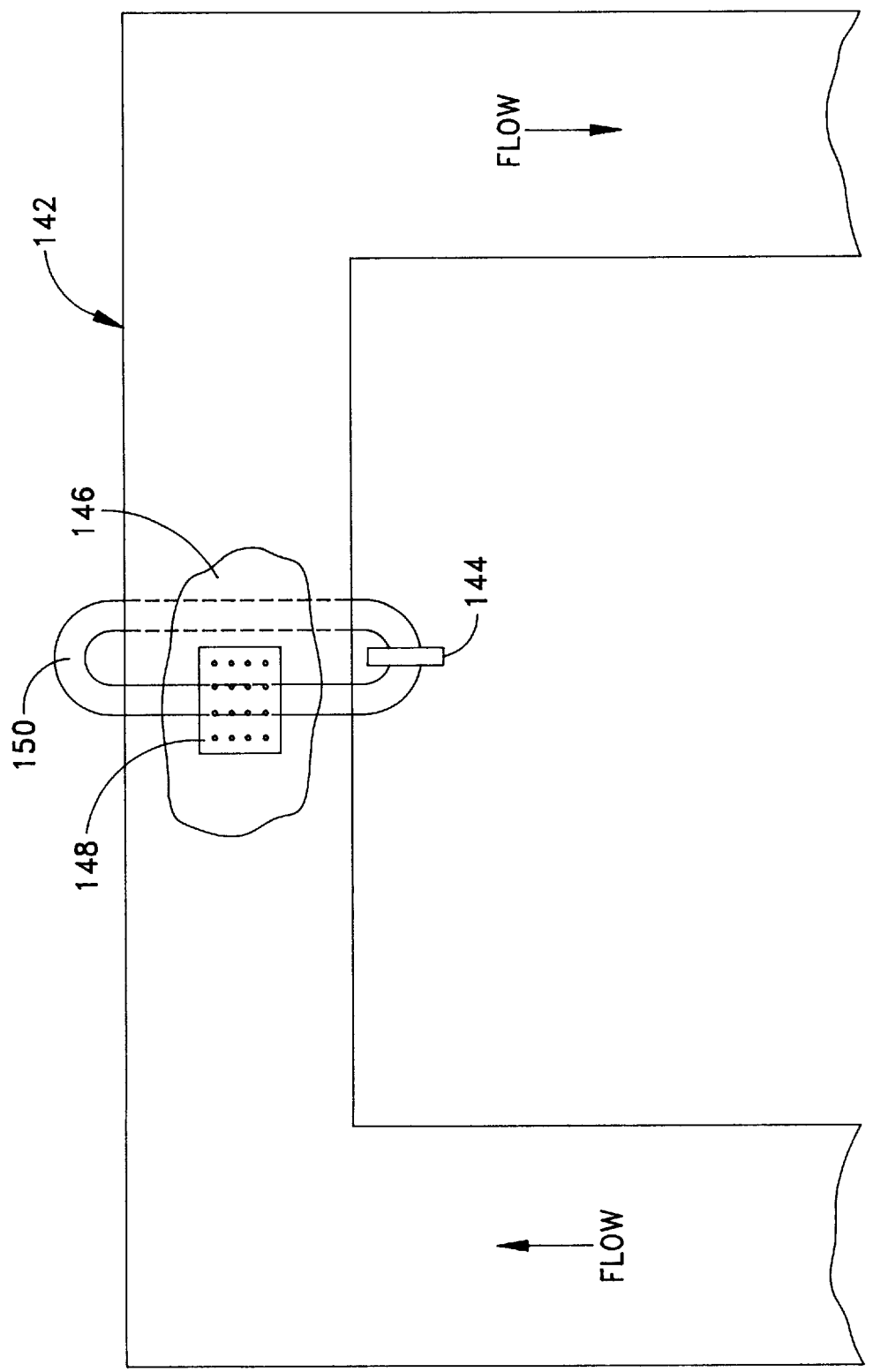
FIG. 15 is a plan view of an alterative fluid flow tunnel partially broken away to show the interior of the tunnel wherein the transducers are physically rotatable relative to the tunnel to achieve movement of the test vehicle.

FIG. 15 shows an alternative tunnel configuration generally indicated at 142 wherein one or more transducer modules 144 (only one shown) is rotatable around the outside of the fluid flow tunnel 142. A test element 146 including a single inner solid body 148 is illustrated within the fluid flow. The test element 146 is positioned and manipulated by the external transducer 144 which is mounted on circular tracks 150 surrounding the water tunnel 142. As described throughout, other configurations of transducer mounts are also possible.

It can therefore be seen that the instant invention provides novel and effective methods of manipulating solid bodies suspended in a fluid. Among the stated advantages of the invention are the following: the ability to remotely position solids suspended in a fluid; the ability to change frequency of the ultrasonic transmission to operate optimally on a predetermined bubble size and spacing; and the ability to produce hydrodynamic drag measurements which are unaffected by physical support devices within the fluid flow.

While there is shown and described herein certain specific structure embodying the invention, it will be manifest to those skilled in the art that various modifications and rearrangements of the parts may be made without departing from the spirit and scope of the underlying inventive concept and that the same is not limited to the particular as set forms herein shown and described except insofar as indicated by the scope of the appended claims.

What is claimed is:

1. A remote manipulation apparatus comprising:
 a fluid region;
 a body having a region of ordered voids in a material; and
 at least two transducers for establishing a standing acoustic wave field having nodal lines through said fluid region, said wave field producing forces on the ordered voids, and causing alignment of said voids with portions of said wave field.

2. The apparatus of claim 1 wherein the region of ordered voids comprises equally spaced rows of voids positioned in the body.

3. The apparatus of claim 2 wherein said rows of voids are spaced by a distance substantially equal to one wavelength of the wave field.

4. The apparatus of claim 2 wherein said body material comprises an elastomeric material and said fluid region comprises water.

5. The apparatus of claim 2 wherein said voids comprise helium bubbles formed in said body material.

6. The apparatus of claim 2 wherein said voids comprise air bubbles formed in said body.

7. The apparatus of claim 1 wherein the size of the voids is approximately one sixth of the distance of the nodal line spacing of the wave field.

8. The apparatus of claim 1 wherein said fluid region and said body material each have a respective acoustic impedance, and the acoustic impedance of the body material and fluid region are substantially matched.

9. The apparatus of claim 1 further comprising a cover material surrounding said body.

10. The apparatus of claim 9 wherein said cover material is acoustically matched with said fluid region and said body material.

11. The apparatus of claim 1 further comprising a frequency control means joined to said at least two transducers and capable of introducing a frequency shift in the wave field whereby nodal lines of the wave field are shifted in a predetermined direction, said shifted nodal lines generating a force on said voids and said body.

12. The apparatus of claim 1 wherein said at least two transducers comprise at least four transducers allowing creation of a plurality of different ultrasonic wave fields through said fluid region.

13. The apparatus of claim 12 further comprising a frequency control means joined to said at least four transducers and capable of introducing frequency shifts in said wave fields whereby nodal lines of the wave fields are shifted in predetermined directions said shifted nodal lines generating a force on said voids and said body.

14. The apparatus of claim 1 wherein said at least two transducers have a movable position relative to said body, said apparatus further comprising transducer positioning means for moving said at least two transducers relative to said body, said movement resulting in movement of said body.

15. Apparatus for manipulating a test vehicle model comprising:
   a fluid flow tunnel having a controllable fluid flow;
   a test model including an outer shell and an inner core having a plurality of internal bodies, each body having at least one region of ordered voids disposed in a material, said test model being disposed within said fluid flow tunnel; and
   a plurality of transducers establishing a plurality of standing acoustic wave fields through said fluid flow in said tunnel, said wave fields producing forces on said ordered voids, and causing alignment of said voids with portions of said wave field.

16. The apparatus of claim 15 further comprising fluid flow control means joined to said fluid flow tunnel and capable of changing flow conditions within the fluid flow tunnel.

17. The apparatus of claim 15 further comprising a plurality of transducer control means, each control means being joined to at least one of said plurality of transducers and being capable of controlling the acoustic power level of the joined at least one transducer, whereby the orientation, position and movement of the test model within the fluid flow can be controlled.

18. The apparatus of claim 17 wherein said transducer control means is capable of introducing phase shifts into said standing acoustic wave fields generated by said joined at least one transducer.

19. The apparatus of claim 15 further comprising transducer positioning means joined to at least one of said plurality of transducers of and capable of moving said joined at least one transducer relative to at least one said body, said movement resulting in movement of said test model within said fluid flow.

20. The apparatus of claim 19 wherein a plurality of said transducers are positioned externally of said fluid flow tunnel relative to said test model.

21. The apparatus of claim 15 wherein:
   each of said plurality of bodies, is associated with position control in a direction; and
   said plurality of transducers comprising pairs of transducers, each pair of transducers being associated with position control in a direction.

22. A method of remotely manipulating a body in a fluid region comprising the steps of:
   providing a region of ordered voids in said body;
   positioning said body within said fluid region;
   establishing an acoustic standing wave field through said fluid region; and
   introducing a frequency shift into said standing acoustic wave field, whereby nodal lines of the wave field are shifted, said ordered voids migrating to re-align with said shifted nodal lines thereby resulting in movement of the body.

23. The method of claim 22 wherein:
   said step of propagating an acoustic standing acoustic wave field comprises propagating a plurality of standing acoustic wave fields through said fluid region; and
   said step of introducing a frequency shift comprises introducing a plurality of frequency shifts to said plurality of standing acoustic wave fields to achieve movement of said body.

24. A method of measuring hydrodynamic performance of a body in a fluid region comprising the steps of:
   providing a fluid flow tunnel having controllable fluid flow;
   providing a body having a plurality of ordered void regions therein;
   disposing said body within said fluid flow tunnel;
   providing a plurality of devices for propagating a plurality of ultrasonic wave fields through said fluid;
   determining a base level of force exerted by the wave fields on said body for a given static position and orientation of the body;
   changing the fluid flow conditions in the fluid flow tunnel over the body to a plurality of predetermined testing conditions while simultaneously controlling the level of force exerted by the wave fields in each predetermined testing condition to maintain a static position of the body within the fluid flow tunnel;
   recording the level of force required to maintain said body in a static position; and
   calculating hydrodynamic performance characteristics of the body by comparing the levels of force required for each testing condition with said base level of force required for the body.

* * * * *